(12) United States Patent
Kawahara et al.

(10) Patent No.: US 7,233,974 B2
(45) Date of Patent: Jun. 19, 2007

(54) METHOD AND APPARATUS FOR AUTOMATICALLY USING A PREDEFINED PEER-TO-PEER GROUP AS A CONTEXT FOR AN APPLICATION

(75) Inventors: Hideya Kawahara, Mountain View, CA (US); Robert Rochetti, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 729 days.

(21) Appl. No.: 10/138,150

(22) Filed: May 1, 2002

(65) Prior Publication Data
US 2003/0208540 A1   Nov. 6, 2003

(51) Int. Cl.
*G06F 15/16* (2006.01)
(52) U.S. Cl. .................... 709/205; 709/204; 709/217
(58) Field of Classification Search ........ 709/201–207, 709/217–219, 227–232
See application file for complete search history.

(56) References Cited

U.S. PATENT DOCUMENTS

| | | | |
|---|---|---|---|
| 2002/0147771 A1* | 10/2002 | Traversat et al. | 709/203 |
| 2002/0156893 A1* | 10/2002 | Pouyoul et al. | 709/225 |
| 2003/0056093 A1* | 3/2003 | Huitema et al. | 713/156 |
| 2003/0093311 A1* | 5/2003 | Knowlson | 705/10 |
| 2003/0105812 A1* | 6/2003 | Flowers et al. | 709/203 |
| 2003/0110079 A1* | 6/2003 | Weisman et al. | 705/14 |
| 2003/0154387 A1* | 8/2003 | Evans et al. | 713/193 |
| 2003/0182184 A1* | 9/2003 | Strasnick et al. | 705/14 |

* cited by examiner

*Primary Examiner*—Krisna Lim
*Assistant Examiner*—Yasin Barqadle
(74) *Attorney, Agent, or Firm*—Park, Vaughan & Fleming, LLP

(57) ABSTRACT

One embodiment of the present invention provides a system that facilitates automatically using a predefined networking group, such as a peer-to-peer group as a context for an application. The system starts by executing the application on behalf of a peer. During execution of the application, the system determines if the peer is a member of a networking group, and if so, the system uses the networking group as a context for the application.

19 Claims, 2 Drawing Sheets

METHOD AND APPARATUS FOR AUTOMATICALLY USING A PREDEFINED PEER-TO-PEER GROUP AS A CONTEXT FOR AN APPLICATION

BACKGROUND

1. Field of the Invention

The present invention relates to networked computer systems. More specifically, the present invention relates to a method and an apparatus for facilitating automatically using a pre-defined peer-to-peer group as a context for an application.

2. Related Art

The explosive growth of the Internet, as well as the growth of large corporate networks, has been fueled by the sharing of information. Virtually all corporate computers, as well as many personal computers, are attached to some sort of network. In recent years, many different types of network-aware protocols have been created to facilitate the sharing of information and the organization of workgroups.

Traditionally, workgroups have been arranged around servers which store and disseminate information to the members of the workgroup. In many instances, clients in a workgroup request information from a server which then delivers the requested information back to the client. This is extremely evident on the Internet where an enormous amount of traffic is the result of browsers on client computers requesting information from web servers which deliver the content back to the requesting browser.

In recent years, the emphasis on many networks has shifted from the client/server approach to a distributed computing approach where virtually all computers attached to the network can act as a server as well as a client. This distributed approach helps balance network traffic by keeping traffic local in many instances, and utilizes otherwise unused network and computing capacity. In addition, numerous programs have been created to facilitate the sharing of files on client computers with the rest of the network.

While the protocols that support networking groups, such as peer-to-peer groups, are complex and well-defined, and have been used by many programs to allow for communications between peers in the group, they cannot currently be used to define a context for an application. Most network-aware applications require the building and maintaining of groups inside the application. For example, in a typical chat program, the user must build the list of contacts that he or she would like to communicate with, even if the client computer is a member of a predefined networking group. In other words, group sharing mechanisms of today allow us simply to share content, but not to share activities or group definitions in a transparent manner to the user.

What is needed is a method and apparatus for automatically using a predefined networking group as a context for an application.

SUMMARY

One embodiment of the present invention provides a system and means for automatically using a predefined networking group, such as a peer-to-peer group, as a context for an application. The system starts by executing the application on behalf of a peer. During execution of the application, the system determines if the peer is a member of a networking group, and if so, the system uses the networking group as a context for the application.

In a variation on this embodiment, the system determines an attribute of the predefined networking group, wherein the attribute may include one of, a membership criteria, a special interest, an access level, and an encryption key. In a further variation, the system configures the application with the attribute of the predefined networking group. For example, if the networking group is part of a fan club for an individual and the application is a search engine, the system might configure the search engine to only search for items pertaining to that individual.

In a variation on this embodiment, the system automatically selects a predefined networking group from a list of predefined networking groups. In the case where a client is a member of an NFS domain or a JXTA group, the system would automatically choose the appropriate predefined networking group to use as a context for the application.

In a variation on this embodiment, the system allows a user to select a predefined networking group from a list of predefined networking groups. For example, in the case where a client is a member of an NFS domain and a JXTA group, the system allows the user to select either the NFS domain or the JXTA group to use as a context for the application.

In a variation on this embodiment, the system uses the context of the application to facilitate sharing the application with a member of the predefined networking group. For example, if a client started a chat application, and no other members of the predefined networking group have the chat application, the system can automatically share the application with the peers in the predefined networking group.

In a variation on this embodiment, the predefined networking group can include: a JXTA group, an NFS group or domain, a multicast group; or a networking domain.

In a variation on this embodiment, the application can include: a chat program, a search engine, a media player, a business application, a web browser, or a game.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system.

This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Predefined Networking Group

Figure 1A:
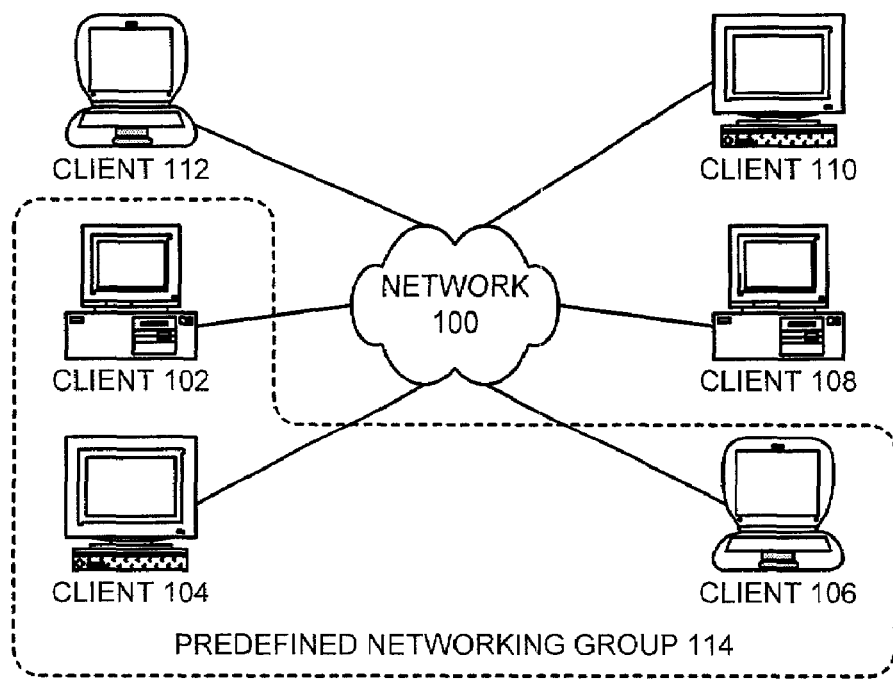
FIG. 1A illustrates a predefined networking group in accordance with an embodiment of the present invention.

FIG. 1A illustrates predefined networking group 114, such as a peer-to-to-peer group, in accordance with an embodiment of the present invention. FIG. 1A includes client 102, client 104, client 106, client 108, client 110, and client 112, which are all attached to network 100. Note that clients 102-112 can generally include any node on a network including computational capability and including a mechanism for communicating across the network. Additionally, network 100 can generally include any type of wire or wireless communication channel capable of coupling together computing nodes. This includes, but is not limited to, a local area network, a wide area network, or a combination of networks. In one embodiment of the present invention, network 100 includes the Internet.

Clients 102–106 are members of predefined networking group 114. Note that clients 102–106 do not have to be in close physical proximity to each other, nor do they have to be attached to the same local link. In one embodiment of the present invention, clients 102–106 are separated by multiple routers and gateways.

Two Predefined Networking Groups

Figure 1B:
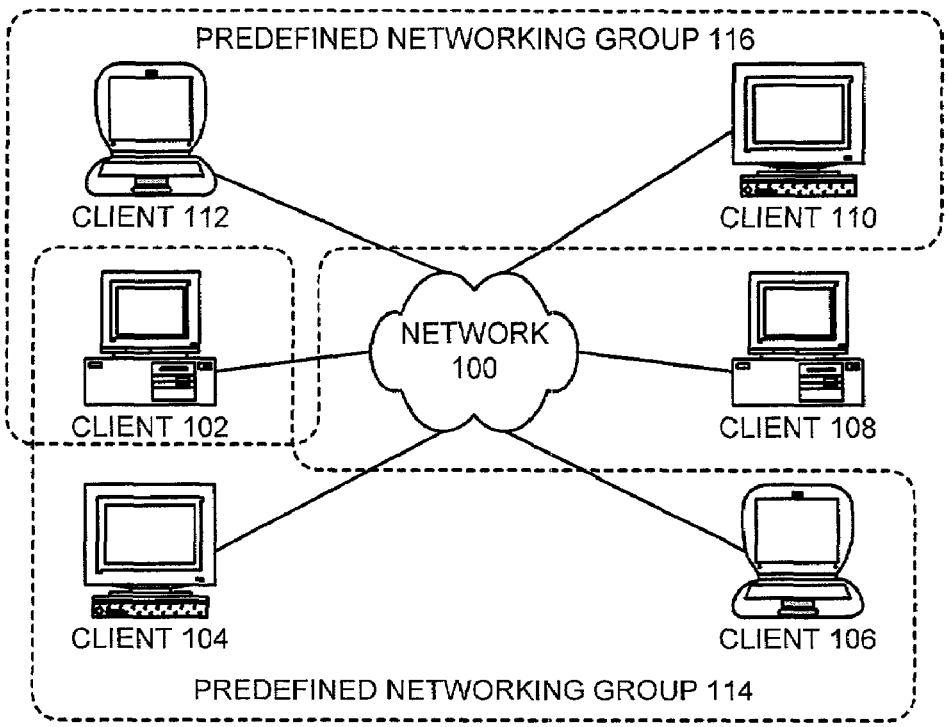
FIG. 1B illustrates two predefined networking groups in accordance with an embodiment of the present invention.

FIG. 1B illustrates two of predefined networking groups in accordance with an embodiment of the present invention. FIG. 1B includes client 102, client 104, client 106, client 108, client 110, and client 112, which are all attached to network 100. Clients 102–106 are members of predefined networking group 114. Client 102 and clients 110–112 are members of predefined networking group 116. Note that client 102 is a member of both predefined networking group 114 and predefined networking group 116.

Predefined networking group 114 and predefined networking group 116 can include, but are not limited to, a JXTA group, an NFS group or domain, a multicast group, or a networking domain. For example, in one embodiment of the present invention, predefined networking group 114 is a JXTA group and predefined networking group 116 is an NFS domain.

Using a Predefined Networking Group as a Context for an Application

Figure 2:
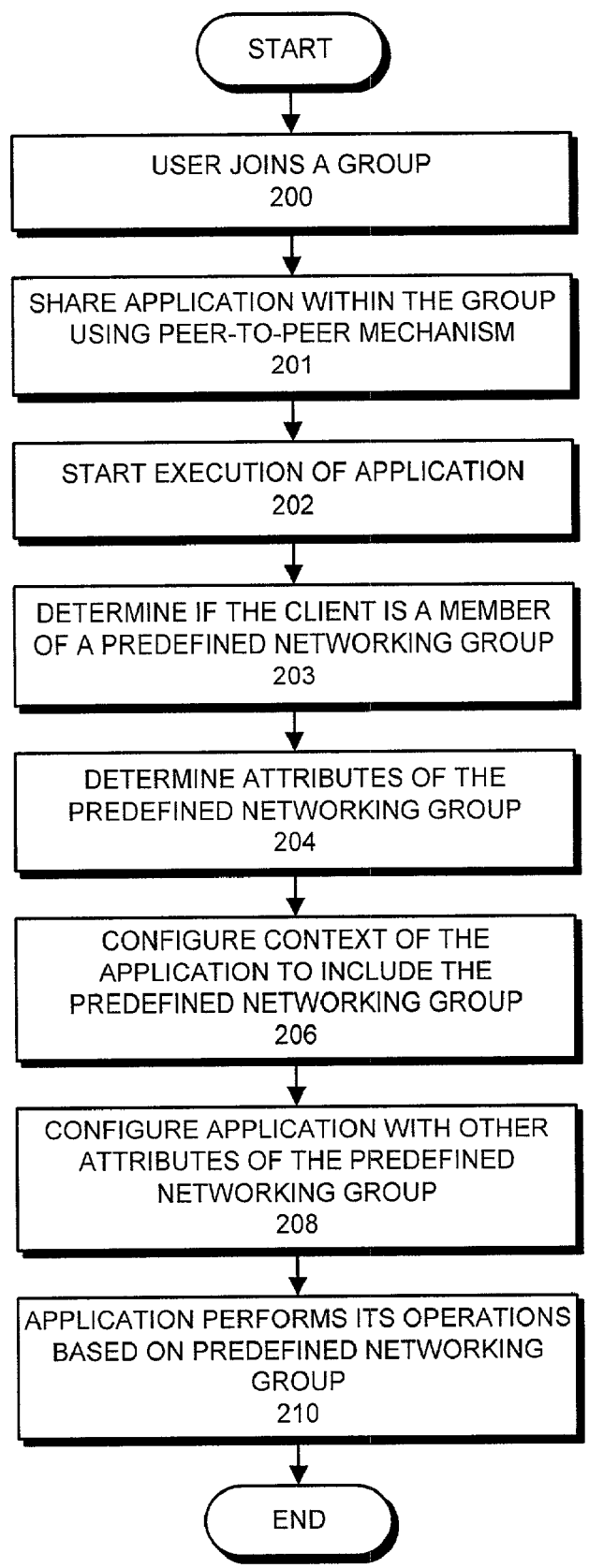
FIG. 2 illustrates the process of automatically using a predefined networking group as the context of an application in accordance with an embodiment of the present invention.

FIG. 2 illustrates the process of automatically using a predefined networking group as a context for an application in accordance with an embodiment of the present invention. First, the system allows a user to join the networking group (step 200). For example, the user may join a JXTA peer-to-peer group or the system may set up a network file system (NFS) domain.

Next, the system shares the application within the group (step 201), for example by using an underlying peer-to-peer mechanism, such as JXTA. In one embodiment of the present invention, if a member of the predefined networking group does not have a copy of the application, the system provides a copy of the application for that member. This can involve sending a copy of the application to the member, or allowing the member to access the application directly from the client. The system then starts the execution of an application on behalf of the peer (step 202).

Next, the system determines if the client is a member of a predefined networking group (step 203). Note that this can be accomplished a number of ways. In one embodiment of the present invention, the system provides a networking library, which the application uses to facilitate communication activity between peers in a group. Upon execution of a communications activity, the system invokes a function provided by the networking library that automatically checks the context in which the function is invoked. This check can be achieved by investigating the location of the binary file in the file directory structure. In many cases, group information is embedded in the file structure. The library might also keep track of group information, such as to what group the client belongs. In another embodiment of the present invention, the system determines if the client is a member of a predefined networking group by scanning the system for the existence of known group types. This may include querying the operating system or polling a directory server.

Note that if the client is a member of more than one predefined networking group, the system can automatically select one of the predefined networking groups to use with the application. Alternatively, the system can allow a user to select one of the networking groups.

Once membership in a predefined networking group is determined, the system determines attributes of the predefined networking group (step 204). These attributes may include, but are not limited to, a group ID, group members, an access level, an encryption key and a compression algorithm. Optionally, these attributes might also include characteristics of the group such as membership criteria. For example, the membership criteria for John Doe's fan club might include being a fan of John Doe.

Next, the system configures a context for the application to include the predefined networking group (step 206) so that the operating environment is shared with all of the members of the predefined networking group. This configuration takes place in a manner that is transparent to the user. A context for the application can includes aspects of the execution environment (including the network) with which the application communicates. For example, if the application is a chat program, the system can configure context information within the chat program to allow the user to chat with the members of the group without the user having to select or build the list of members. In another example, if the application is a networked game, the system can configure the context information within the application to allow the user to play with the members of the group without the user having to specify the group or its members.

Once a context of the application is configured, the system can configure the application with other attributes of the predefined networking group (step 208). For example, if the application is a chat program and the members of a specific chat group are interested in automobiles, the chat program can be configured to display banner advertisements related to automobiles.

Finally, application performs its operations based on the predefined networking group (step 210).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for automatically using a predefined networking group as a context for an application, comprising:
executing the application on behalf of a peer;
during execution of the application, looking up a predefined networking group to which the peer belongs, wherein looking up the predefined networking group involves automatically selecting the predefined networking group from a list of predefined networking groups and examining a networking library;
during subsequent execution of the application, using the predefined networking group as the context for the application,
wherein using the predefined group as the context for the application involves determining and using aspects of the execution environment in the selected predefined group with the application, and enabling the availability of group definitions and group activities for use within that application;
determining an attribute of the predefined networking group, wherein the attribute can include a product interest; and
configuring the application with the attribute of the predefined networking group, wherein configuring the application with the attribute can involve displaying banner advertisements associated with a product of interest,
whereby the application performs operations based on the context of the selected predefined group.

2. The method of claim 1,
wherein the attribute may include one of a membership criteria, a special interest, an access level, a compression algorithm, and an encryption key.

3. The method of claim 1, further comprising allowing a user to select a predefined networking group from a list of predefined networking groups.

4. The method of claim 1, further comprising using the context of the application to facilitate sharing the application with a member of the predefined networking group.

5. The method of claim 1, wherein the predefined networking group can include one of:
a JXTA group;
an NFS group or domain;
a multicast group; and
a networking domain.

6. The method of claim 1, wherein the application can include one of:
a chat program;
a search engine;
a media player;
a business application;
a web browser; and
a game.

7. A computer-readable storage medium storing instructions that when executed by a computer cause the computer to perform a method for automatically using a predefined networking group as a context of an application, the method comprising:
executing the application on behalf of a peer;
during execution of the application, looking up a predefined networking group to which the peer belongs, wherein looking up the predefined networking group involves automatically selecting the predefined networking group from a list of predefined networking groups and examining a networking library;
during subsequent execution of the application, using the predefined networking group as the context for the application,
wherein using the predefined group as the context for the application involves determining and using aspects of the execution environment in the selected predefined group with the application, and enabling the availability of group definitions and group activities for use within that application;
determining an attribute of the predefined networking group, wherein the attribute can include a product interest; and
configuring the application with the attribute of the predefined networking group, wherein configuring the application with the attribute can involve displaying banner advertisements associated with a product of interest, whereby the application performs operations based on the context of the selected predefined group.

8. The computer-readable storage medium of claim 7, wherein the attribute may include one of a membership criteria, a special interest, an access level, a compression algorithm, and an encryption key.

9. The computer-readable storage medium of claim 7, wherein the method further comprises allowing a user to select a predefined networking group from a list of predefined networking groups.

10. The computer-readable storage medium of claim 7, wherein the method further comprises using the context of the application to facilitate sharing the application with a member of the predefined networking group.

11. The computer-readable storage medium of claim 7, wherein the predefined networking group can include one of:
a JXTA group;
an NFS group or domain;
a multicast group; and
a networking domain.

12. The computer-readable storage medium of claim 7, wherein the application can include one of:
a chat program;
a search engine;
a media player;
a business application;
a web browser; and
a game.

13. An apparatus for automatically using a predefined networking group as a context of an application, comprising:
an execution mechanism configured to execute the application on behalf of a peer;
an lookup mechanism configured to look up a predefined networking group to which the peer belongs, wherein looking up the predefined networking group involves automatically selecting the predefined networking group from a list of predefined networking groups and examining a networking library;
a configuration mechanism configured to use the predefined networking group as the context for the application,
wherein using the predefined group as the context for the application involves determining and using aspects of the execution environment in the selected predefined group with the application, and enabling the availability of group definitions and group activities for use within that application; and
a determining mechanism configured to determine an attribute of the predefined networking group, wherein the attribute can include a product interest;

wherein the configuration mechanism is further configured to configure the application with the attribute of the predefined networking group, wherein configuring the application with the attribute can involve displaying banner advertisements associated with a product of interest, whereby the application performs operations based on the context of the selected predefined group.

14. The apparatus of claim 13, wherein the attribute may include one of a membership criteria, a special interest, an access level, a compression algorithm, and an encryption key.

15. The apparatus of claim 13, wherein the configuration mechanism is further configured to allow a user to select a predefined networking group from a list of predefined networking groups.

16. The apparatus of claim 13, wherein the configuration mechanism is further configured to use the context of the application to facilitate sharing the application with a member of the predefined networking group.

17. The apparatus of claim 13, wherein the predefined networking group can include one of:
 a JXTA group;
 an NFS group or domain;
 a multicast group; and
 a networking domain.

18. The apparatus of claim 13, wherein the application can include one of:
 a chat program;
 a search engine;
 a media player;
 a business application;
 a web browser; and
 a game.

19. A means for automatically using a predefined networking group as a context for an application, comprising:
 an execution means for executing the application on behalf of a peer;
 a lookup means, wherein during execution of the application, the lookup means looks up a predefined networking group to which the peer belongs, wherein looking up the predefined networking group involves automatically selecting the predefined networking group from a list of predefined networking groups and examining a networking library; and
 a context means, wherein during subsequent execution of the application, the context means uses the predefined networking group as the context for the application,
  wherein using the predefined group as the context for the application involves determining and using aspects of the execution environment in the selected predefined group with the application, and enabling the availability of group definitions and group activities for use within that application;
 a determining means for determining an attribute of the predefined networking group, wherein the attribute can include a product interest; and
 a configuring means for configuring the application with the attribute of the predefined networking group, wherein configuring the application with the attribute can involve displaying banner advertisements associated with a product of interests,
 whereby the application performs operations based on the context of the selected predefined group.

* * * * *